US008683232B2

(12) United States Patent
Yuen et al.

(10) Patent No.: US 8,683,232 B2
(45) Date of Patent: Mar. 25, 2014

(54) SECURE USER/HOST AUTHENTICATION

(75) Inventors: Michael Yuen, Clayton (AU); Patrick Siu-Ying Hung, Saratoga, CA (US)

(73) Assignee: CPO Technologies Corporation, Sunnyvale, CA (US)

( * ) Notice: Subject to any disclaimer, the term of this patent is extended or adjusted under 35 U.S.C. 154(b) by 6 days.

(21) Appl. No.: 13/428,502

(22) Filed: Mar. 23, 2012

(65) Prior Publication Data

US 2012/0297205 A1 Nov. 22, 2012

Related U.S. Application Data

(60) Provisional application No. 61/562,078, filed on Nov. 21, 2011, provisional application No. 61/487,661, filed on May 18, 2011.

(51) Int. Cl.
*H04L 29/06* (2006.01)

(52) U.S. Cl.
USPC ................ 713/193; 713/183; 713/171; 726/5

(58) Field of Classification Search
USPC ................................ 713/193, 183, 171; 726/5
See application file for complete search history.

(56) References Cited

U.S. PATENT DOCUMENTS

| 6,216,230 | B1 * | 4/2001 | Rallis et al. ................ 713/185 |
| 6,275,933 | B1 * | 8/2001 | Fine et al. ........................ 713/2 |
| 6,401,205 | B1 * | 6/2002 | Rallis et al. ................ 713/172 |
| 6,425,084 | B1 * | 7/2002 | Rallis et al. ................ 713/185 |
| 6,460,138 | B1 * | 10/2002 | Morris ........................ 713/184 |
| 6,564,325 | B1 * | 5/2003 | Travostino et al. ............. 726/21 |
| 6,671,808 | B1 * | 12/2003 | Abbott et al. ...................... 726/4 |
| 6,857,076 | B1 * | 2/2005 | Klein ........................... 713/189 |
| 7,096,370 | B1 * | 8/2006 | Klein ........................... 713/193 |
| 7,114,082 | B2 * | 9/2006 | Klein ........................... 713/193 |
| 7,526,795 | B2 * | 4/2009 | Rollins ........................... 726/3 |
| 7,540,018 | B2 * | 5/2009 | Rollins ........................... 726/3 |
| 7,594,257 | B2 * | 9/2009 | Rollins ........................... 726/3 |
| 7,681,247 | B2 * | 3/2010 | Williams ........................ 726/34 |
| 7,861,094 | B2 * | 12/2010 | Klein ........................... 713/189 |
| 7,895,443 | B2 * | 2/2011 | Grove et al. ................... 713/182 |
| 7,979,720 | B2 * | 7/2011 | Klein ........................... 713/189 |
| 8,001,288 | B2 * | 8/2011 | Cortopassi et al. ............. 710/13 |
| 8,065,718 | B2 * | 11/2011 | Grove et al. ....................... 726/9 |
| 8,191,159 | B2 * | 5/2012 | Rollins ........................... 726/27 |
| 8,230,162 | B2 * | 7/2012 | Yu et al. ........................ 711/103 |
| 8,356,118 | B2 * | 1/2013 | Komoda .......................... 710/13 |
| 8,392,978 | B2 * | 3/2013 | Grove et al. ....................... 726/9 |
| 2002/0190130 | A1 * | 12/2002 | Yoshimura ..................... 235/487 |
| 2010/0023783 | A1 * | 1/2010 | Ambady ....................... 713/193 |
| 2010/0174913 | A1 * | 7/2010 | Johnson et al. ............... 713/186 |
| 2010/0197306 | A1 * | 8/2010 | Lopes ......................... 455/435.1 |

(Continued)

*Primary Examiner* — David Garcia Cervetti
(74) *Attorney, Agent, or Firm* — Kenta Suzue; Haynes Beffel & Wolfeld LLP

(57) ABSTRACT

A portable storage device has a storage peripheral interface connecting to a computer. An encrypted data storage is available to the computer connected to the interface. The encrypted data storage includes a first part accessible after an authentication. A controller has a first operation mode performing encryption and decryption of data of the first part after the authentication of a first combined credential. The encryption and the decryption rely on a cipher key derived from a second combined credential. The first combined credential and the second combined credential are derived from at least a computer signature of the computer connected to the interface and a user credential of a user of the computer connected to the portable storage device.

16 Claims, 12 Drawing Sheets

(56) References Cited

U.S. PATENT DOCUMENTS

| | | |
|---|---|---|
| 2010/0250796 A1* | 9/2010 | Jevans et al. .................... 710/36 |
| 2011/0083017 A1* | 4/2011 | Ali et al. ........................ 713/185 |
| 2011/0107416 A1* | 5/2011 | Poo et al. ........................ 726/19 |
| 2011/0131418 A1* | 6/2011 | Teng et al. .................... 713/185 |
| 2011/0145482 A1* | 6/2011 | Yu et al. ......................... 711/103 |
| 2011/0321147 A1* | 12/2011 | Chakra et al. ..................... 726/9 |
| 2012/0131350 A1* | 5/2012 | Atherton ....................... 713/186 |
| 2012/0233674 A1* | 9/2012 | Gladstone et al. ................ 726/6 |
| 2013/0114810 A1* | 5/2013 | Kobayashi et al. ............. 380/47 |

* cited by examiner

SECURE USER/HOST AUTHENTICATION

REFERENCE TO RELATED APPLICATION

This application claims the benefit of U.S. Application No. 61/562,078 filed 21 Nov. 2011 and claims the benefit of U.S. Application No. 61/487,661 filed 18 May 2011, all of which are incorporated herein by reference.

BACKGROUND

1. Field of the Invention

This technology relates to computer authentication of a local storage peripheral.

2. Description of Related Art

The storage capacity of USB pen drive increases by roughly 50% every year. With the advent of USB 3.0 technology, the USB pen drive data transfer rate is ten times faster than before and can go beyond 300 MBps. It is increasingly attractive for many people to carry all their personal or company data around in a tiny pen drive. It is convenient, environmentally friendly and can improve productivity.

Yet, this trend is also very dangerous from a security standpoint as many people lose their pen drives every day. The confidential information stored in the lost or stolen pen drives may be read by anyone, including strangers, identity thieves and competitors.

One common solution is to employ full-disk encryption based on hardware-based AES-256 or other encryption algorithm. No one can access the information inside the encrypted partition unless she knows a correct password. This approach is simple, fast and seemingly safe as AES-256 itself is fairly difficult to break. Unfortunately, computer hackers are notoriously good at guessing user passwords. While the encryption algorithm (e.g. AES-256) may be secure, many human-generated passwords are not. Oftentimes many people recycle similar passwords for all applications. Some use simple passwords from dictionary or based on their birthdays.

Even if we force users to enter a strong password (e.g. equivalent to a 256-bit random number), many of them simply record their passwords down on a piece of paper. This arguably is even worse for two reasons:

Because the user has to carry the paper with her (e.g. in office or outside), a thief can steal the pen drive and the paper at the same time.

When the user misplaces her paper, all information inside the drive is permanently lost.

One enhancement to the first solution is to use file-system-level encryption on top of full-disk encryption. Although the additional passwords can improve security, file-system-level encryption is typically very slow because they are software based. This drastically reduces productivity and defeats the purpose of high-speed USB 3.0 interface.

Another solution is to incorporate a biometric reader in a pen drive. The user cannot access the data unless she has the correct biometric features (e.g. fingerprint). An optional password may be required depending on implementation.

In existing security systems the authentication is performed sequentially: Credential 1 is authenticated; if authentication is successful then credential 2 is authenticated, if authentication is successful then credential 3 is authenticated, and so forth.

A problem with this approach is that the data associated with the authentication of each credential is stored separately from other credentials. This leads to a much greater risk of unauthorized attacks on each credential, separately, with or without knowledge of the other credentials.

For example, if one of the credentials is the user password, the associated authentication data is, typically, a hash value. Given knowledge of the implementation and physical access to the portable storage device, it is quite feasible for an attacker to recover the original raw password from the stored hash value. Typically, this would be achieved through a dictionary attack where a large set of common words, names, letter-number combinations, and commonly-used passwords are entered, one at a time, into the hash function in an attempt to find a match with the stored hash value. For passwords with high entropy, this approach will not work, but when it is considered that most users employ simple, low entropy, passwords, this form of attack is quite feasible.

In some basic security systems, credential authentication forms the only barrier to unauthorized access, i.e. the user data is stored unencrypted, and once authentication is passed, the host is allowed access to the stored user data. An attacker who has physical access to the device and knowledge of the implementation can easily recover the user data, even without any security credentials.

In some other security systems, in addition to credential authentication, the user data is stored encrypted. However, the cipher key that is used to encrypt the user data is stored on the device in an unencrypted form. An attacker who has physical access to the device and knowledge of the implementation can easily recover the user data after decrypting with the stored cipher key.

In yet other security systems, in addition to credential authentication and user data encryption, the user data cipher key is encrypted using a single credential. This approach is quite secure; however, if the raw credential has low entropy, such as a typical user password, there is a risk that the raw credential be recovered by using a dictionary attack on the encrypted user data. This can be achieved by decrypting the encrypted cipher key using each candidate password, separately, from the dictionary, to form a candidate cipher key. This cipher key is then used to decrypt the encrypted user data. The decrypted user data is then analyzed for intelligibility. If the data is deemed intelligible, then the corresponding candidate password matches the original user password used to encrypt the user data. This form of attack is only feasible if the unencrypted user data is already known or has a regular structure, such as a plain text file.

SUMMARY

Unlike the previous solutions, some embodiments satisfy all customer requirements: security, convenience, flexibility and high performance at a very low cost. By limiting the portable storage device to be used in authorized computers, its security does not rely solely on user passwords. The algorithm is immune to reverse engineering: the portable storage data, user password and computer authorization information are protected even if an illegal user has complete knowledge of the design and can read every raw data byte directly from the non-volatile storage media used in the portable storage such as a pen drive. The technology is flexible allowing multiple users and multiple authorized computers, and can achieve high performance taking full advantage of USB 3.0 high bandwidth. The technology is cost effective and does not require expensive components such as a biometric reader or an on-chip serial number (e.g. e-fuse, non-volatile memory).

Various embodiments use multiple credentials concurrently to authenticate authorized access to data stored on a portable storage device, and multiple credentials to form the cipher key that is used to encrypt/decrypt said data.

User data is encrypted before being stored in non-volatile memory on a portable storage device. Similarly, the encrypted ciphertext is decrypted before being returned from the portable storage device. Three steps are performed for storage or retrieval of the data on the device:

1. Authentication: Authentication requires processing a combination of multiple credentials to the portable storage device.
2. Cipher key generation: the cipher key that is used to encrypt/decrypt the user data is generated directly, or secured indirectly, using the processing of a combination of multiple credentials.
3. Encryption/Decryption: A cryptographic cipher requires the correct cipher key to decrypt/encrypt the data on the device.

One aspect of the technology is an apparatus comprising a portable storage device with a storage peripheral interface connecting to a computer. The portable storage device includes an encrypted data storage and a controller.

The encrypted data storage is available to the computer connected to the interface. The encrypted data storage includes a first part accessible after an authentication.

The controller has a first operation mode performing encryption and decryption of data of the first part after the authentication of a first combined credential. The encryption and the decryption rely on a cipher key derived from a second combined credential.

The first combined credential and the second combined credential are derived from at least a computer signature of the computer connected to the interface and a user credential of a user of the computer connected to the portable storage device.

Another aspect of the technology is a method, comprising the following step(s):

in response to connecting a storage peripheral interface of a portable storage device to a computer, making an encrypted data storage of the storage peripheral available to the computer connected to the interface, including:
  performing authentication of a first combined credential; and
  performing at least one of encryption and decryption relying on a cipher key derived from a second combined credential,
  wherein the first combined credential and the second combined credential are derived from at least a computer signature of the computer connected to the interface and a user credential of a user of the computer connected to the portable storage device.

Another aspect of the technology a nontransitory computer readable medium with computer readable instructions, that practice the technology described herein.

Various aspects of the technology can each optionally include one or more of the following features.

The authentication is successful for the first combined credential derived from at least the computer signature of any computer registered with the portable storage device, and the user credential of the user registered with the portable storage device.

The authentication precedes construction of the cipher key relied on for encryption and decryption.

The authentication compares (i) a first authentication value derived from the first combined credential with (ii) a second authentication value stored on a second part of the encrypted data storage of the portable storage device.

The authentication follows construction of the cipher key relied on for encryption and decryption.

The authentication relies on an accurate comparison between validation blocks including: (i) a validation block decrypted with the cipher key relied on for encryption and decryption, and (ii) a plaintext validation block on at least one of the portable storage device and the computer connected to the interface.

The storage peripheral interface is any of USB, Firewire, eSATA, and an Apple dock connector.

The authentication is performed by at least one of the portable storage device and the computer connected to the interface of the portable storage device.

The user credential included in the first combined credential is from one of a plurality of users registered to the portable storage device.

The computer signature included in the first combined credential is from one of a plurality of computers registered to the portable storage device.

The authentication compares (i) a first authentication value derived from the first combined credential with (ii) a second authentication value derived from authentication data stored on the computer connected to the interface.

The controller has a plurality of operation modes including:
  the first operation mode for all computers registered with the portable storage device and all users registered with the portable storage device;
  a second operation mode in which, for a subset of all computers registered with the portable storage device, the authentication, decryption and encryption require at least only one of (i) the computer signature of the computer connected to the interface and (ii) the user credential of a user of the computer connected to the portable storage device.

The controller has a plurality of operation modes including:
  the first operation mode for all computers registered with the portable storage device and all users registered with the portable storage device;
  a second operation mode in which, for a subset of all users registered with the portable storage device, the authentication, decryption and encryption require at least only one of (i) the computer signature of the computer connected to the interface and (ii) the user credential of a user of the computer connected to the portable storage device.

The authentication relies on an asymmetric key pair including a private key and a public key, and an accurate comparison between validation blocks received at the portable storage device from the computer connected to the interface, the validation blocks including: (i) a first validation block received in encrypted form at the portable storage device and decrypted at the portable storage device with the public key on the encrypted storage device, and (ii) a plaintext validation block.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

Illustrative Overview

Various embodiments secure the data stored on a removable data storage device from unauthorized access. Such a device is connected to a host computer via one of the host's external device interfaces, for example, USB or IEEE1394.

Before authorized access is granted, the device may either be hidden from the host system or configured in such a way that the data on the device is inaccessible or unintelligible to the host. After successful authorization, the device is accessible by the host as a regular data storage device, such as an external thumb drive or hard disk.

In different embodiments, the user data is stored on the device in encrypted or non-encrypted form.

Figure 1:
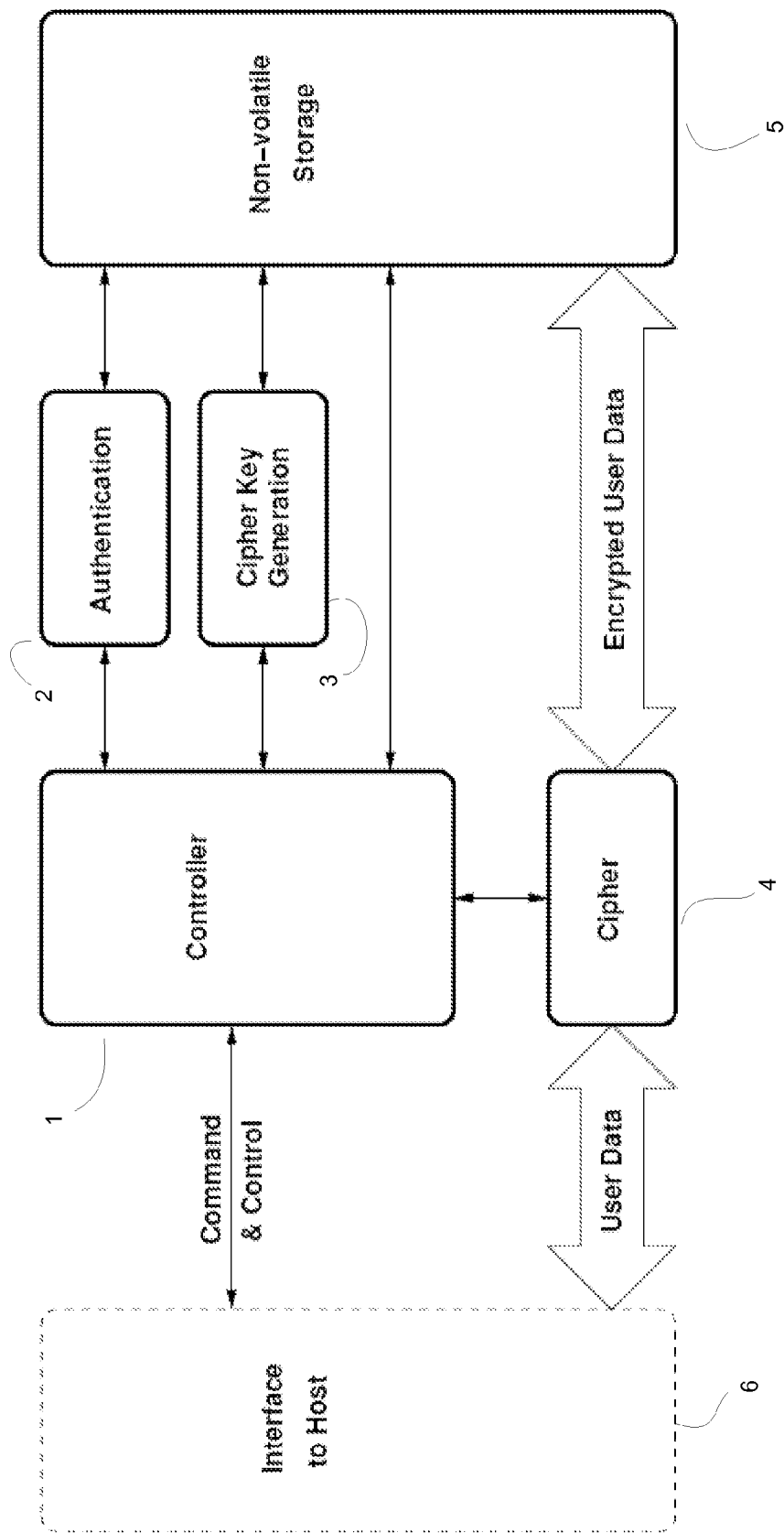
FIG. 1 shows a block diagram of a portable data storage device.

The heart of the security system resides on the removable data storage device which, typically, is implemented as a combination of both software and hardware components. The major components of the system are illustrated in FIG. 1. A Controller 1 receives command & control signals from the host security application software and host operating system. The Authentication 2 subsystem authenticates credentials transmitted from the host software. The Cipher Key Generation 3 subsystem manages the cipher key used by the Cipher 4 to encrypt/decrypt the encrypted user data in the Non-volatile Storage 5 and transfer user data between the Interface to Host 6. The Non-volatile Storage 5 is also used to store meta-data associated with the Authentication 2 and Cipher Key Generation 3 subsystems.

Additional software on the host retrieves data about the host computer and the user of the host, and provides high-level control of the security system on the device. This software may reside in the operating system or as application software above the operating system.

In some embodiments, a host computer is the entity to be authenticated, and the host computer's unique signature value is a credential. In some embodiments, a computer user is the entity to be authenticated, and the user's secret password is a credential.

Figure 2:
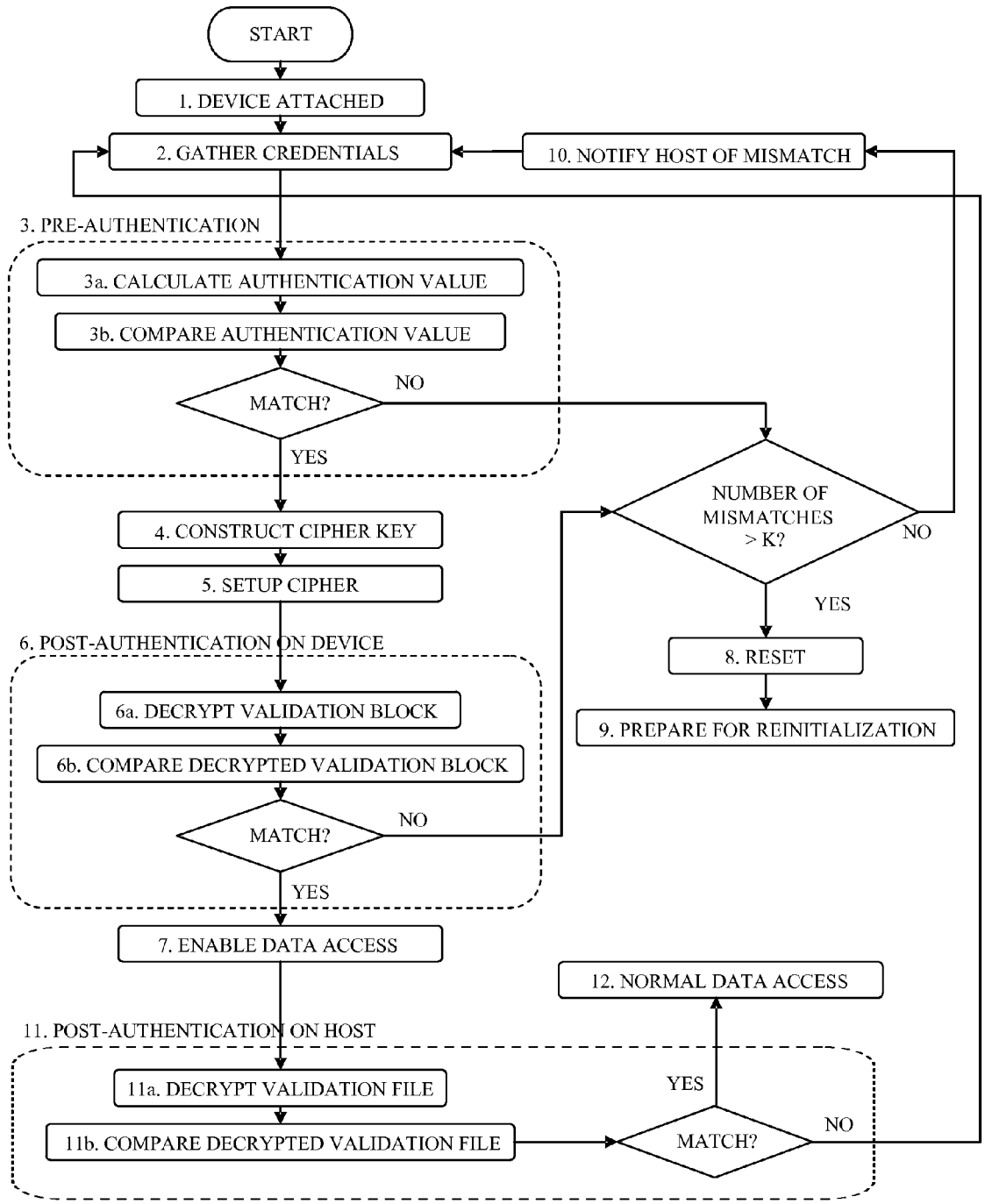
FIG. 2 is a flowchart of authentication and cipher key generation.

The flowchart of FIG. 2 describes the overall authentication and cipher key generation process using two credentials, namely a user password and computer signature. The process described in the flowchart is not limited to only 2 credentials: it may be extended to 3 or more, depending on the embodiment. The process described in the flowchart is a single mode of operation of the device. The device may have multiple modes with a different process.

In Step 1, the data storage device is recognized by the host computer: the device may have been inserted into the host, or otherwise connected to a host local to the device, or the host is started with the device already connected. A local host has a physical position proximate to the data storage device.

In Step 2, the host-side application software is executed and prompts for credentials such as the user name and user password. Some other embodiments use other credential combinations. The software also retrieves the computer name and relevant information about the host hardware and software, including—but not limited to—network adapter address (MAC), BIOS serial number, CPU serial number, graphics card serial number, motherboard serial number, OS serial number and OS type. From these hardware and software identifiers, a unique computer signature is formed that distinguishes the host from any other host.

These credentials are transferred from the host to the device. With some embodiments the communication between the host and device may be encrypted to avoid eavesdropping.

Authentication of the credentials may be performed in any of the following steps: Step 3 (pre-authentication), Step 6 (post-authentication on device), or Step 11 (post-authentication on host); depending on the embodiment. When a particular authentication is performed, then the other authentications and their corresponding steps may be skipped.

In Step 3a, the device combines the user password and computer signature to form a single authentication value. Typically, a cryptographic hash function (e.g. SHA256) or key derivation function (e.g. PBKDF2) is used to aid in the calculation of the authentication value. Collectively, such functions are referred to as cryptographic derivation functions (CDF), and the outputs of these functions are referred to as hash values or hashes.

The user password and computer signature may be merged together prior to being passed into the CDF. Alternatively, the user password and computer signature may be hashed separately, and the two resultant hash values are merged together in some manner (e.g. bit-wise XOR) to form the final authentication value.

In Step 3b, the authentication value calculated in Step 3a is compared with a previously stored list of authorized authentication values. Each stored authentication value corresponds with a particular user/computer combination. The user name and computer name are used as indices into the list. As such, if there is a quantity M of authorized users, and a quantity N of authorized computers, then there is a quantity M*N of stored authentication values. Some combinations may be disallowed, thereby obviating the need to store a corresponding authentication value. If the newly calculated authorization value and the stored value match then authentication is successful.

In Step 4, a cipher key is constructed using both the user password and computer signature received from the host application software. Step 4 follows Step 3 if the pre-authentication was successful. Alternatively, if pre-authentication was not performed, Step 4 follows Step 2.

In Step 5, the cipher key is used to setup the cryptographic cipher to enable the encryption and decryption of the user data on the storage device.

If post-authentication on the device is used, Step 6a is performed which involves the decryption of an encrypted validation data block. In Step 6b, the decrypted data block is compared with the original, plaintext, validation data block. If they match, then authentication is successful.

If authentication is performed on the device in Step 3 or Step 6, and authentication was successful then the operational flow continues to Step 7 in which the security system allows access to the user data storage; notifying the host application software and OS of the change in access status, and allowing read/write operations on the user data.

If, instead, authentication is conducted on the host in Step 11, then no authentication is performed on the device, and the operational flow jumps directly from Step 5 to Step 7. In this case, it is incumbent on the host to perform Steps 11a and 11b to check for correct credentials by comparing a decrypted validation file on the device with a previously recorded reference that is stored on the host. If 11b matches, then the device can be accessed normally. Otherwise, the host must submit new credentials to the device for subsequent attempts at authentication.

In the event of a mismatch in Step 3b or Step 6b, the security system checks the number of consecutive mismatches. If the number exceeds a given number K, then the system assumes an unauthorized user is trying to access the data. Hence, the system proceeds to Step 8 in which the user data on the drive is made permanently inaccessible, and the security system is reset. Other possibilities for handling failed authentication include using a timer to prevent additional authentication attempts for a given amount of time, say 1 hour or 1 day. Another possibility is that there is a special "administrator" recovery mode which may require one or more, previously specified, passwords only known to a special administrator user.

In Step 9, the host application is notified of the security system reset, and prepares for the device to be re-initialized by the host application. The steps undertaken in re-initialization depend on the embodiment. In an example case, at least an administrator ID and password is set. Subsequent to that, the administrator adds authorized users and authorized computers.

If the number of consecutive mismatches does not exceed K, then the device performs Step 10, notifying the host application software that the user password or computer signature was wrong, and returns to Step 2 for a retry. The user data on the device remains inaccessible.

Credentials

The type and number of credentials used for authentication varies with the embodiment.

The above illustrative example restricted access to the portable storage device based on two credentials: a secret password known only to the user of the device, and a digital signature value that uniquely identifies the computer host into which the device is connected. Additional credentials may include physical location (GPS coordinates), temperature, humidity, ambient light, ambient sound, presence of a secondary portable device (dongle/token), etc. The type of credential that can be used is only limited by the ability of the embodiment to convert the credential into a digital value that can be submitted to the device for authentication.

The credential used to authenticate the user is not limited to an alphanumeric (keyboard submitted) password. Other user-based credentials may include, for example, fingerprints, handprints, retina patterns, DNA, or touchpad drawings.

The computer signature is derived from information that uniquely identifies the host computer, including—but not limited to—network adapter address (MAC), BIOS serial number, CPU serial number, graphics card serial number, motherboard serial number, OS serial number and type. From these hardware and software identifiers, a unique computer signature value is formed.

In some embodiments, each of these identifiers is converted into byte-strings. These byte strings are then concatenated together, and fed into a CDF to produce a single computer signature value.

In some other embodiments, each identifier is converted into an integer value. The values are summed (or bit-wise XORed) together to form the computer signature value. However, with this method there is a greater likelihood of collisions (different summed values producing the same computer signature value) compared to using a CDF.

Authentication

As described above, authentication may be performed either before or after the generation of the cipher key: pre-authentication or post-authentication.

Pre-Authentication

With the proposed pre-authentication method of various embodiments, authentication is performed concurrently: the multiple credentials are merged in some way to create a single authentication value, and the authentication is performed with the single value.

A benefit of this approach is that it is not feasible to recover one raw credential from the stored authorization data without first knowing the other raw credentials, even assuming knowledge of the implementation and physical access to the storage device.

An example is a two credential authentication, with one credential being a user password, and the other credential being a computer signature value. With concurrent authentication, only a single authentication value is stored for both credentials. Due to the high entropy of the combined credentials, it is not feasible to recover either of the raw credentials from the single stored authentication value.

However, if an attacker has knowledge of the raw computer signature, it is then feasible to isolate the two components used to form the single authentication value, and, hence, recover the raw user password using a dictionary attack. So, in general, if an attacker wants to even attempt to recover one of the raw credentials from the stored authentication value, then the attacker would need to have knowledge of the other raw credentials.

Pre-authentication employs some form of cryptographic hash function or key derivation function (KDF). The specifics of the hash function or KDF vary among different embodiments, but, in general, an input x is passed into the function (e.g. SHA256 or PBKDF2), and the output is the corresponding hash or derived value X. In this paper, these hash functions or KDFs are collectively referred to as cryptographic derivation functions (CDFs).

In some embodiments only two credentials are used for authentication, namely, user password and computer signature. In other embodiments the authentication can be applied more generally to two or more credentials.

Figure 3:
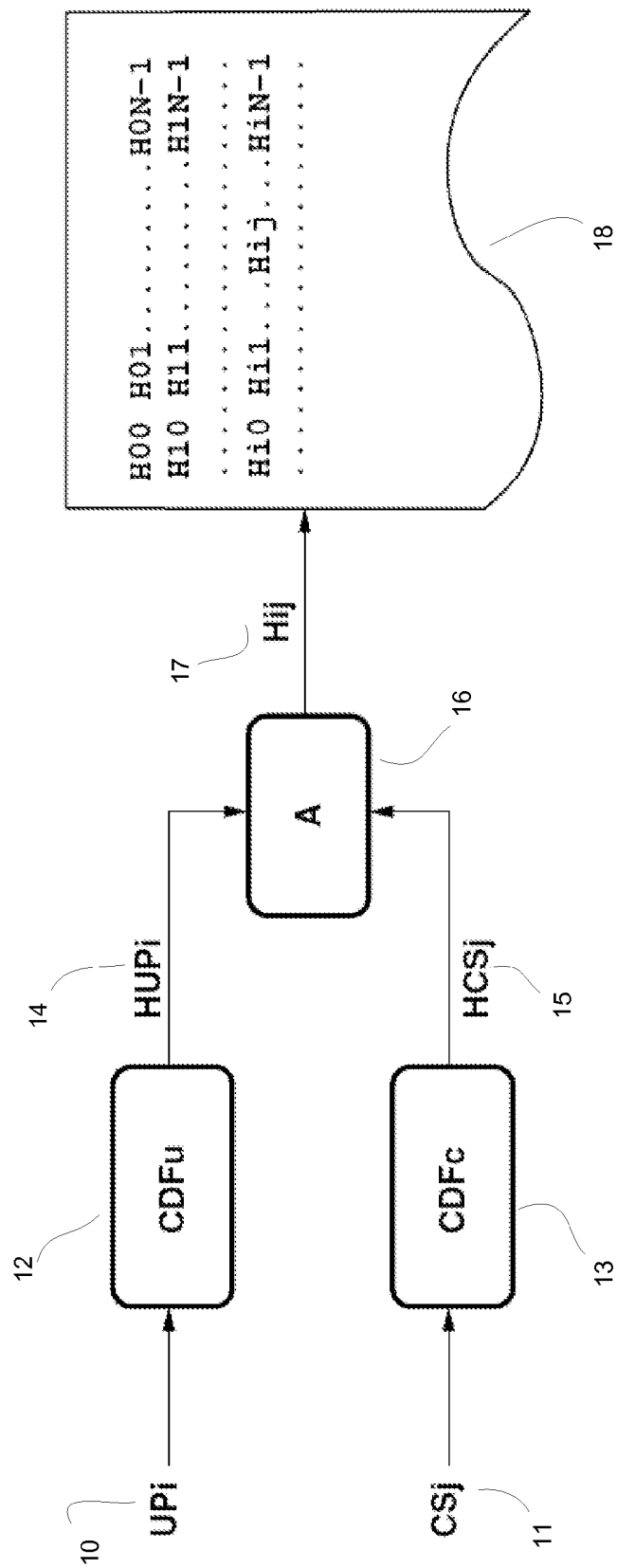
FIG. 3 is a flow diagram of authentication initialization of credentials.

Illustrated in FIG. 3 is the authentication initialization of a single pair of user password UPi 10 and computer signature CSj 11. A CDF is performed, separately, of CDFu 12 on UPi 10, and CDFc 13 on CSj 11, producing HUPi 14 and HCSj 15. HUPi 14 and HCSj 15 are combined in some manner at authentication value generation block A 16, e.g. using bit-wise XOR, to produce the master authentication value Hij 17. In some embodiments, the length of the CDF values is at least 128-bits or greater to avoid collisions after combining different values of HUPi and HCSj. For example, given HUPi is the hexadecimal value 0xf34a14292123934a, and HCSj is 0x78938dacb92cf3ed; a bit-wise XOR of these two values produces Hij: 0x8bd99985980f60a7.

In some other embodiments, UPi and CSj are combined first then entered into the CDF to form the master CDF value Hij. For example, given the byte-string for UPi: [0x23 0x42 0x53 0x12 0xf3 0x2a 0x48], and the byte-string for CSj: [0x5f 0xd3 0x9a 0x3e 0x22 0xaa], the two byte strings may be combined through simple concatenation: [0x23 0x42 0x53

0x12 0xf3 0x2a 0x48 0x5f 0xd3 0x9a 0x3e 0x22 0xaa]. The combined byte string is then entered into the CDF to produce Hij.

A similar initialization is performed for every authorized pair of user and computer. Therefore, given M quantity of authorized users and N quantity of authorized computers, M*N authentication values are stored, such as shown in master authentication store 18. Additional stored meta-data uniquely identifies each user and computer pair to map to a specific authentication value.

Figure 4:
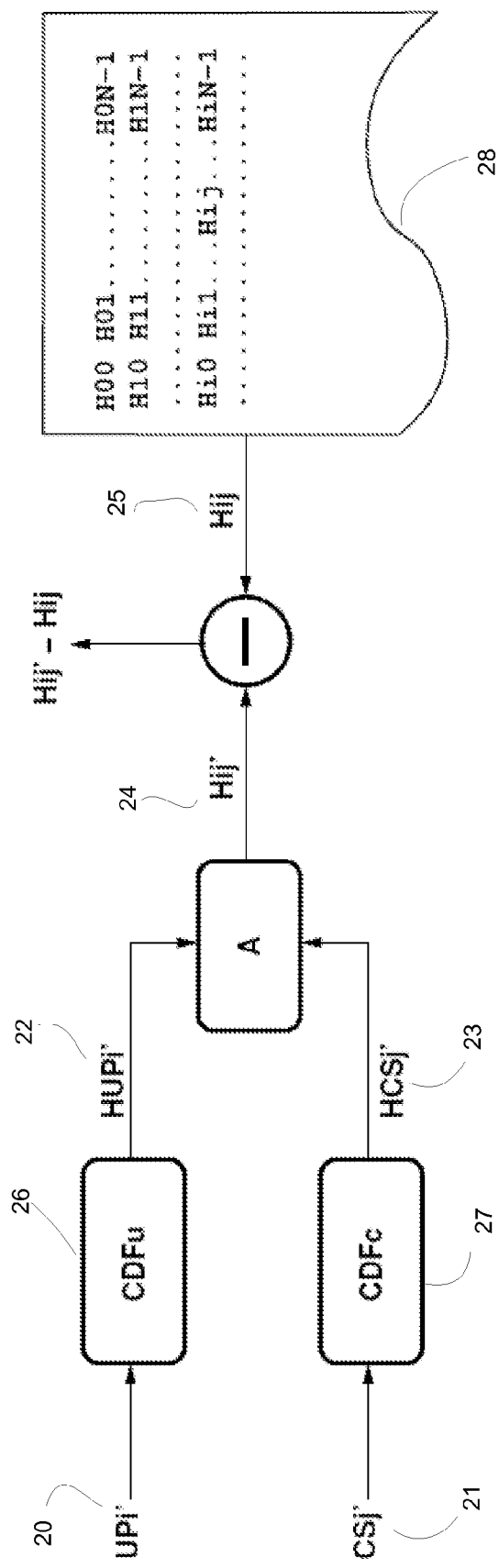
FIG. 4 is a flow diagram of authentication of credentials.

After initialization, the authenticity of a supplied password for user i and a signature for computer j is verified using the method illustrated in FIG. 4

A CDF is performed, separately, of CDFu 26 on UPi' 20, and CDFc 27 on CSj' 21, producing HUPi' 22 and HCSj' 23. HUPi' 22 and HCSj' 23 are combined in the same manner as in the initialization to produce the authentication value Hij' 24. If Hij' 24 is identical to the previously stored Hij 25 from the master authentication store 28, then the supplied user password UPi' 20 and computer signature CSj' 21 are authentic.

One disadvantage of this form of authentication is the storage of the M*N authentication values and any other supporting meta-data.

However, with this form of authentication there is a significant reduction in the risk of unauthorized recovery of the secret user password or computer signature from the stored authentication values.

With the storage of a single CDF value for both the user password and computer signature it is not feasible to reconstruct the user password without first knowing the computer signature; or, similarly, it is not feasible to reconstruct the computer signature without first knowing the user password.

It is important to note that implementations of this invention may provide for a more flexible authentication and cipher key generation scheme in which one or more of the specified credentials are not required before allowing access to the data stored on the device. For example, some particular users may be allowed access on all computers: In this case, only the password for the given user is needed before access is granted. In other scenarios, for some particular computers, all users may be allowed access; so, no user password is required: only the computer signature is needed. In other scenarios, certain computers may only be accessed by certain users.

Post-Authentication

Figure 5:
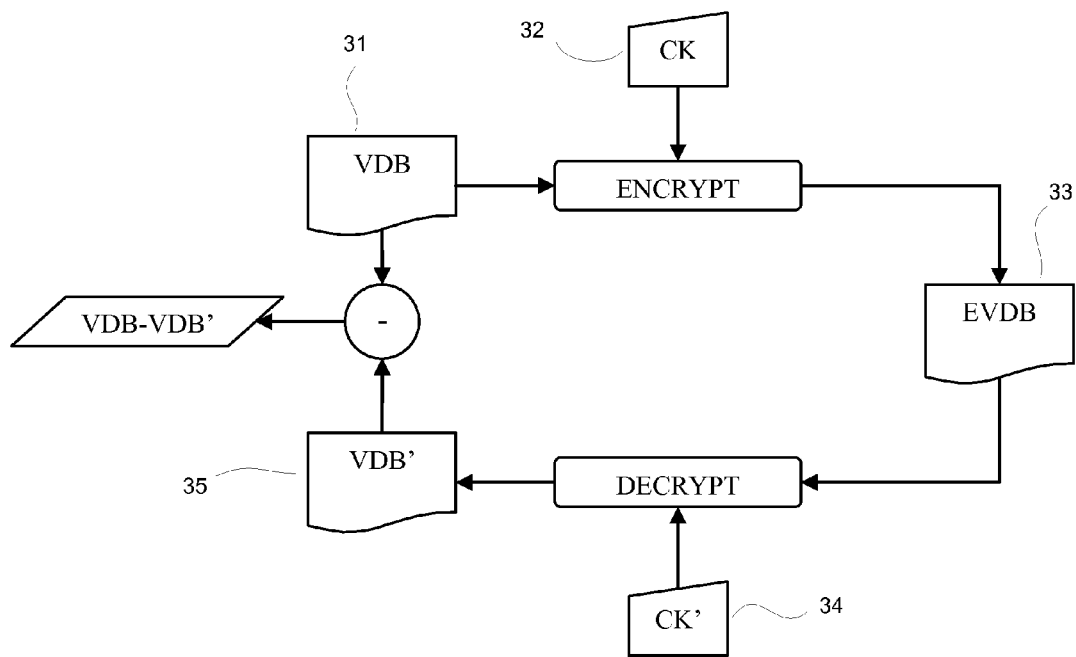
FIG. 5 is a flow diagram of post-authentication.

Illustrated in FIG. 5 is an example of post-authentication.

When post-authentication is performed on the device, a plaintext validation data block VDB 31 is used as a reference. This reference VDB 31 is stored in an area outside the user data space on the device. When the storage device is initialized, a cipher key CK 32 is generated using the credentials supplied from the host application software. The method by which the CK 32 is generated is described further on. This cipher key is used to encrypt the VDB 31, with the resultant encrypted VDB (EVDB) 33 stored on the device in an area outside the user data space on the device.

For subsequent post-authentication, a cipher key CK' 34 is generated using the newly supplied credentials. CK' 34 is used to decrypt the EVDB 34, and the resultant decrypted VDB' 35 is compared with the reference VDB 31. If they are the same, then the credentials are the same, and authentication is successful.

With some embodiments, post-authentication is performed by the host, rather than the device, with the host submitting credentials to the device then reading a previously written data file from the device. Authentication is established by verifying that the contents of the presently retrieved (and decrypted) data file are the same as a reference data file stored on the host. If the data matches, then the credentials that were used by the device to generate the cipher key and decrypt the presently retrieved data file are the same as that used to encrypt the previously written data file; therefore, the credentials are authentic.

With post-authentication, no stored CDF authentication values are required. Rather, the stored encrypted user data, or a reference validation data block, provides the means to authenticate the credentials.

As will be described next, multiple credentials are used as an input to directly, or indirectly, generate a cipher key to be used to encrypt and decrypt the user data or validation data block. The cipher key generation process would have to be reversed for an attacker to recover the raw credentials from the encrypted user data. Additionally, as with pre-authentication, for an attacker to recover one of the raw credentials, the attacker would need to have knowledge of the other raw credentials to be able to isolate the single targeted raw credential.

Cipher Key Generation

The authentication methods described above provide one line of defense from unauthorized access to the stored encrypted user data.

Figure 6:
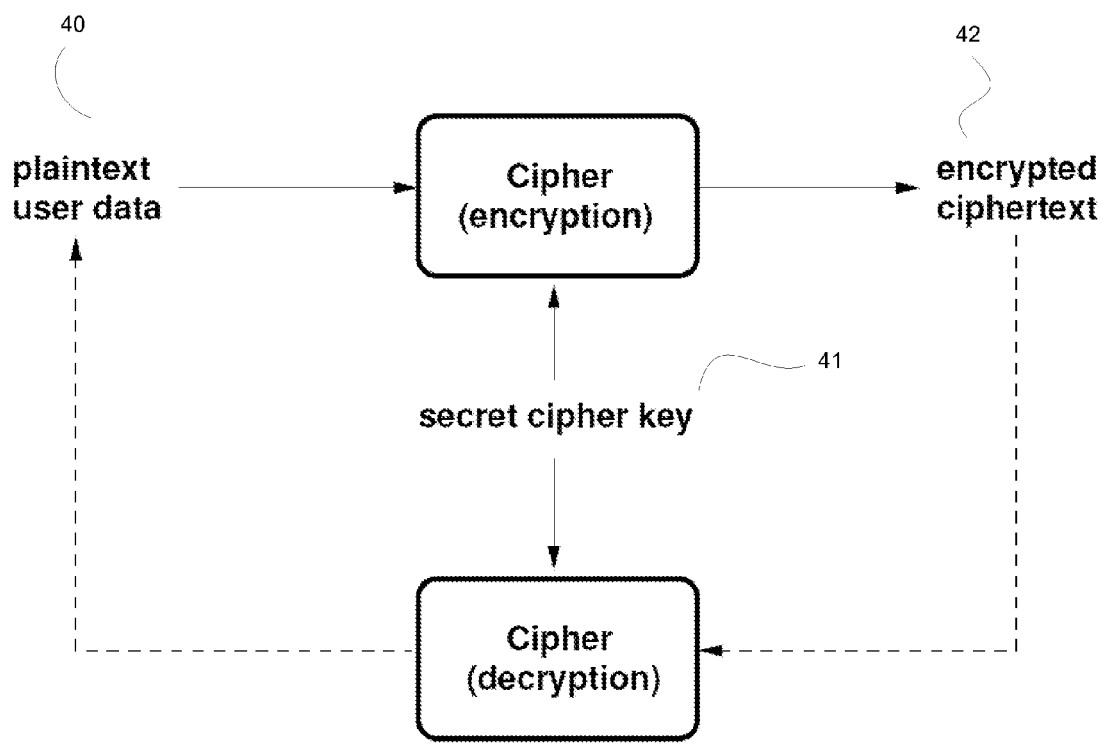
FIG. 6 is a flow diagram of encryption and decryption.

Another line of defense is the encryption of the user data using a secret cipher key. A description of the encryption and decryption process is illustrated in FIG. 6. Plaintext user data 40 is encrypted using a secret cipher key 41. The output is encrypted ciphertext 42, which is then stored in non-volatile memory. The plaintext user data 40 can be retrieved by decrypting the encrypted ciphertext 42 using the same secret cipher key 41.

For the following discussion the specifics of the encryption or decryption process, i.e. the symmetric-key cipher vary with particular embodiments: some example embodiments are AES, RC4, Twofish. In various embodiments the secret cipher key is derived from the multiple credentials. Two example methods are illustrated here: direct and indirect. Other embodiments are directed to different methods of using multiple credentials to generate the cipher key.

The following description of the cipher key generation process uses two credentials, namely a user password and a computer signature. The process is not limited to only 2 credentials: it may be extended to 3 or more, depending on the embodiment.

Direct Cipher Key Generation

With the direct method, the cipher key that is used by the cipher to encrypt/decrypt the user data is derived directly from the multiple credentials.

Figure 7:
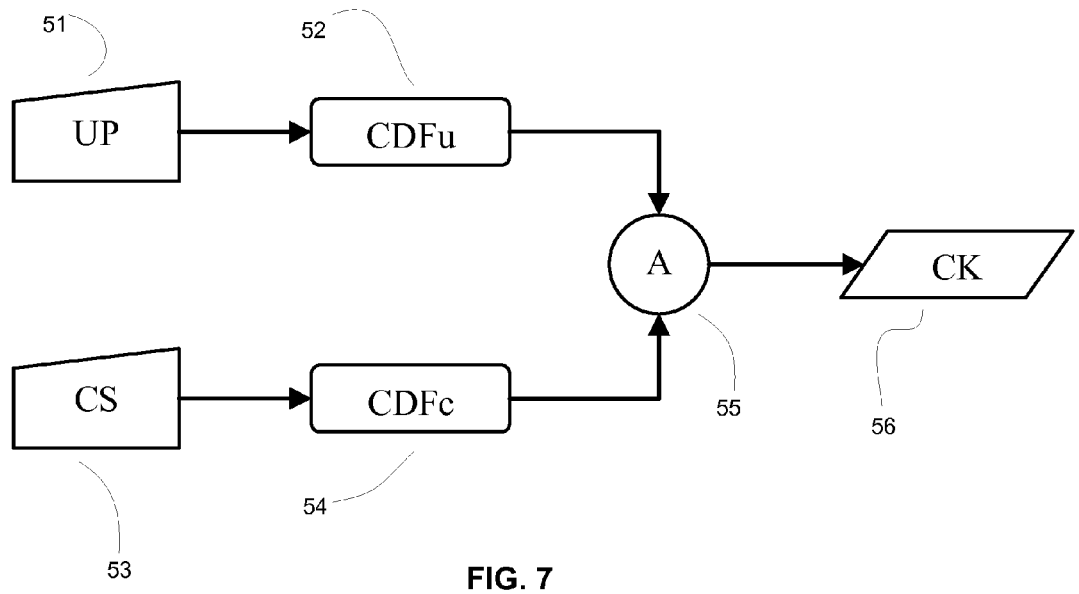
FIG. 7 is a flow diagram of directly forming a cipher key derived from a combination of credentials.

In the approach illustrated in FIG. 7, the user password UP 51 is passed into CDFu 52. Similarly, the computer signature CS 53 is passed into CDFc 54. The results of these two CDFs are combined by block A 55 in some manner, e.g. bitwise XOR, to form the user data cipher key CK 56.

Figure 8:
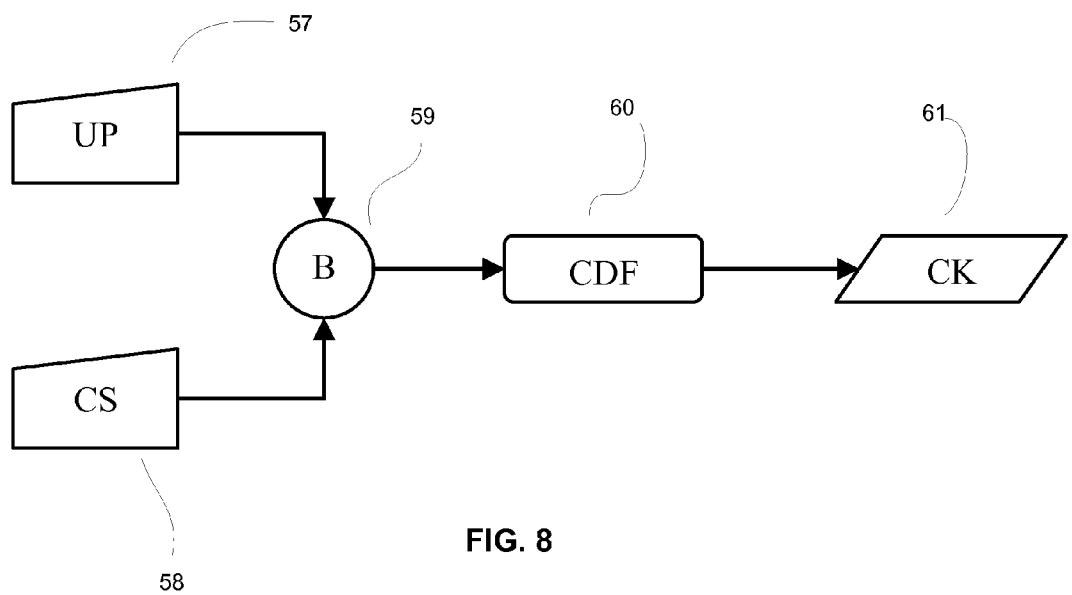
FIG. 8 is another flow diagram of directly forming a cipher key derived from a combination of credentials.

Alternatively, as illustrated in FIG. 8, the user password UP 57 and computer signature CS 58 are combined by block B 59 in some manner, e.g. byte-stream concatenation, before being entered into CDF 60. The output of the CDF is used as the user data cipher key CK 61.

An advantage of the direct method is that there is no need to store any metadata on the device associated with the user data cipher key. A disadvantage is that any change to the credentials, e.g. a password change, requires any previously encrypted user data to be re-encrypted using a cipher key derived from the new credentials.

Indirect Cipher Key Generation

With indirect cipher key generation, the credentials are used to form a key encryption key (KEK) which, in turn, is used to encrypt the user data cipher key. This approach allows for changes in the credentials without affecting the cipher key: changes in the cipher key would require re-encryption of the stored, encrypted, user data.

Figure 9:
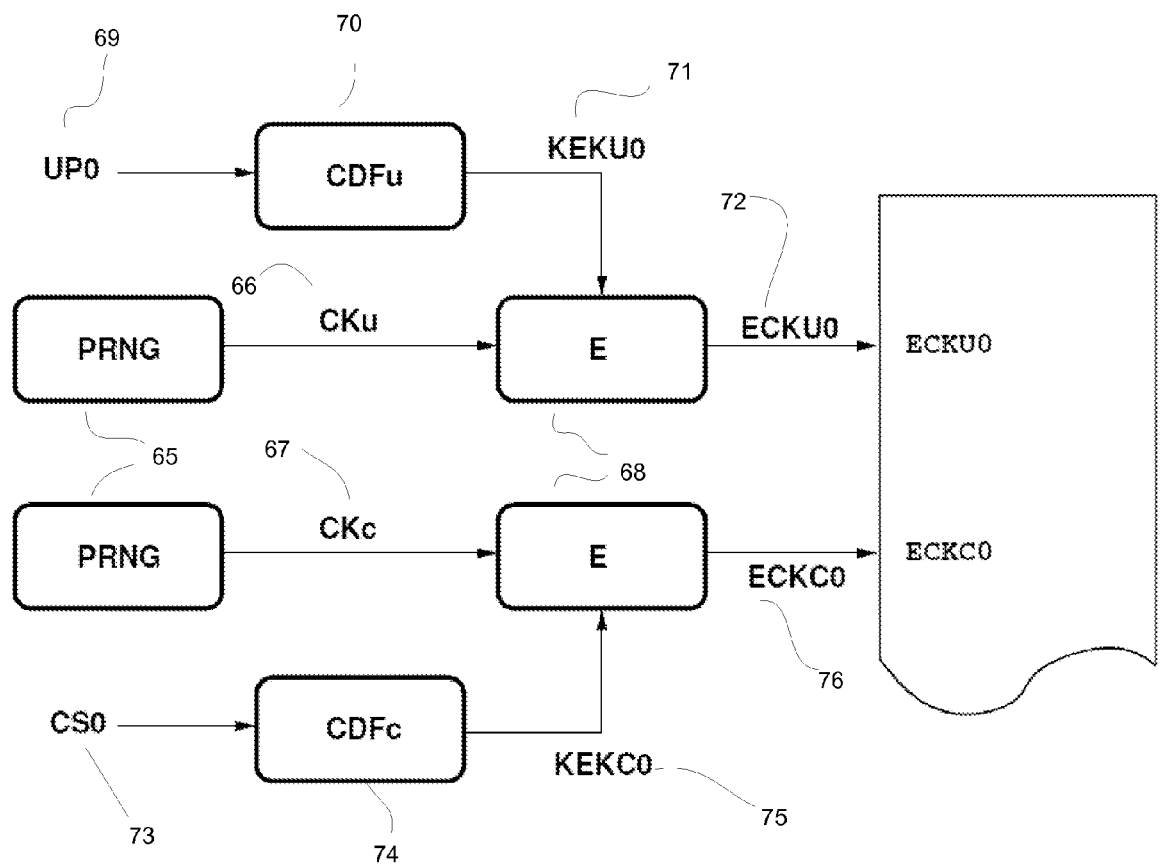
FIG. 9 is a flow diagram of indirectly initializing a cipher key.

Initialization of the cipher key is described in FIG. 9. A pseudo-random number generator (PRNG) 65 is used to create random numbers CKu 66 and CKc 67 which will be used to form the user data cipher key.

The password UP0 69 of the initial user is fed into CDFu 70 to produce a key encryption key KEKU0 71. KEKU0 71 is used as the symmetric cipher key to encrypt CKu 66 using the symmetric cipher E 68. The output of E 68 is the encrypted CKu, ECKU0 72. A similar series of steps is used to encrypt CKc 67 to produce ECKC0 76, using the signature of the first registered computer CS0 73 to form a key encryption key KEKC0 75, used as the symmetric cipher key to encrypt CKc 67 using the symmetric cipher E 68 to produce the encrypted CKc, ECKC0 76. Both ECKU0 72 and ECKC0 76 are stored in non-volatile memory on the device.

Figure 10:
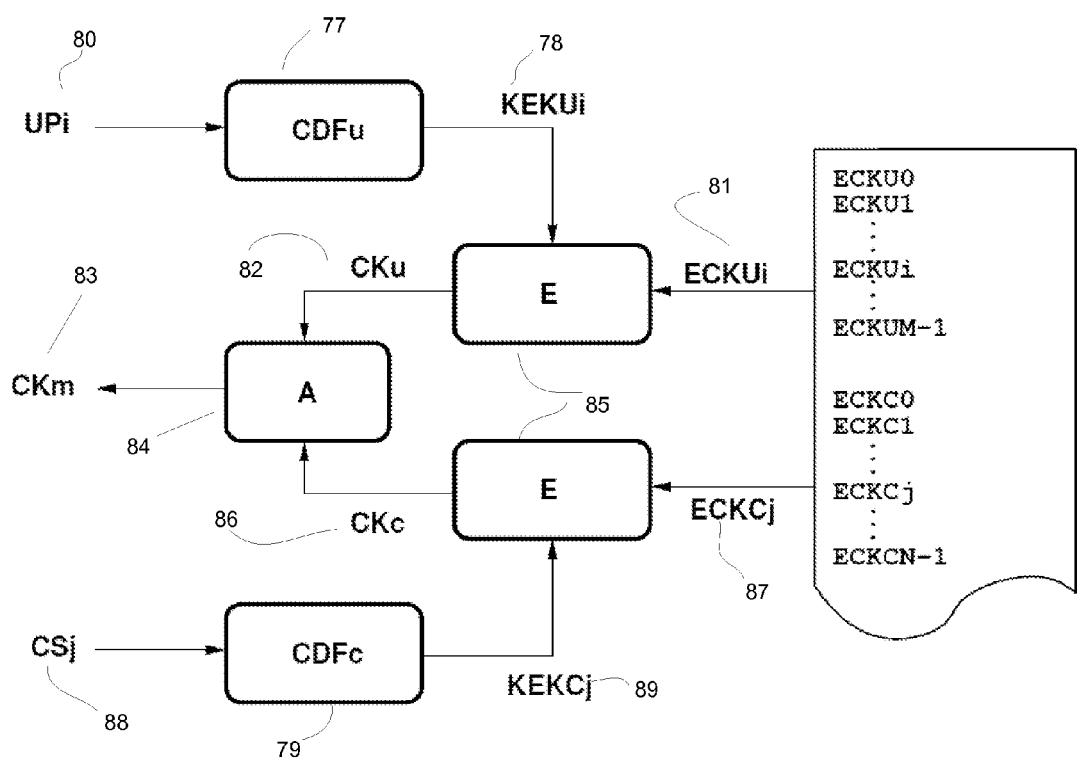
FIG. 10 is a flow diagram of indirectly calculating the master cipher key.

The retrieval of CKu and CKc, and the calculation of the master user data cipher key CKM, is illustrated in FIG. 10. The encrypted cipher key component ECKUi 81 of the ith registered user is retrieved from non-volatile memory and decrypted using the symmetric cipher E 85 and user password UPi 80 (fed into CDFu 77 to produce key encryption key KEKUi 78) to form the cipher key component CKu 82. Similarly, ECKCj 87 of the jth registered computer is decrypted using the symmetric cipher E 85 and computer signature CSj 88 (fed into CDFc 79 to produce key encryption key KEKCj 89) to form the cipher key component CKc 86. Both CKu 82 and CKc 86 are combined in some manner, e.g. bit-wise XOR, by block A 84 to form the master cipher key CKm 83.

A single CKm value is used as the cipher key to encrypt and decrypt the user data on the storage device. Similarly, there is only one CKu value used by all users, and a single CKc value used by all computers. However, the encrypted and stored versions of CKu and CKc, i.e. ECKUi and ECKCj, respectively, differ since they are encrypted using KEK values derived from different user passwords and computer signatures. The reason for this approach is to allow changes in user passwords and computer signatures without affecting the master cipher key CKm used to encrypt the user data that is shared by all users and computers. So, a change to UPi of the ith user would only require the re-encryption of CKu to form a new ECKUi. Similarly, if the computer signature CSj for the jth registered computer is changed, then CKc would need to be re-encrypted to form a new ECKCj.

Unlike the cipher key generation methods of other technology described previously, with this system it is not feasible to use a dictionary attack to recover the user password UPi from the encrypted user data. The encrypted user data is encrypted using CKm, which is formed from both CKu and CKc.

So, if an attacker were to attempt to recover UPi from the encrypted user data, the attacker must first have CKc to be able to form CKm. A dictionary attack would proceed by each candidate UPi' from the dictionary being used to decrypt ECKUi to form the candidate CKu'. This CKu' would be merged with the known CKc to form CKm'. CKm', in turn, would be used to decrypt the user data, and the decrypted user data would be analyzed for its intelligibility. Intelligible decrypted user data would suggest that the candidate UPi' is the same as the user password originally used to encrypt CKu by the original UPi.

So, similar to multi-credential authentication, an attack to recover any one target raw credential from the encrypted user data stored on the device is not possible without knowledge of all the other raw credentials.

A disadvantage of this method is the storage of the encrypted cipher key components ECKUi and ECKUj. Given quantity M of authorized users and quantity N of authorized computers, M+N encrypted cipher keys are stored on the device along with any supporting meta-data.

Usage Modes

Some embodiments allow for authentication and cipher key generation with multiple credentials with the ability to disallow access for specific combinations of credentials. For example, given a two credential—user password and computer signature—authentication, the device can be accessed by:

Some users on all registered computers; and,

Some users on some registered computers, but not other registered computers.

This is achieved by simply not recording the authentication value and cipher key values for the invalid combinations, so that attempts to authenticate using the invalid combinations will always fail.

However, there are applications in which one, or more, of the credentials may not be needed for a successful authentication. For example, given a two credential—user password and computer signature—authentication, the device can be accessed:

By some users on unregistered computers; and,

On some computers by unregistered users.

In some embodiments, the device operates multiple modes with at least one mode that does not require the processing of a combination of multiple credentials for authentication and cipher key generation. Such access capabilities may be implemented by recording special mode bits with the stored data (names, authentication values, cipher keys) of these more liberated users and computers, and using standard single credential authentication and cipher key generation.

Authentication Using Asymmetric Key Cryptography

Some embodiments also include modes of operation that provide supplementary authentication methods that augment the previously described multiple combined credential authentication method. One such authentication method uses asymmetric (public-key) cryptography to register and authenticate an entity's credentials.

Asymmetric cryptography uses a key-pair (public- and private-key) for the encryption of plaintext data, and the decryption of the corresponding encrypted ciphertext. The ciphertext that is formed from the encryption of plaintext using the public-key of a key-pair, can only be decrypted using the private-key of the key-pair. Similarly, the ciphertext that is formed from the encryption of plaintext using the private-key of a key-pair, can only be decrypted using the public-key of the key-pair. Another important property of the key-pair is that it is not feasible to derive the private-key from the public-key, or vice-versa. A commonly-used asymmetric key cipher is RSA (PKCS#1).

Figure 11:
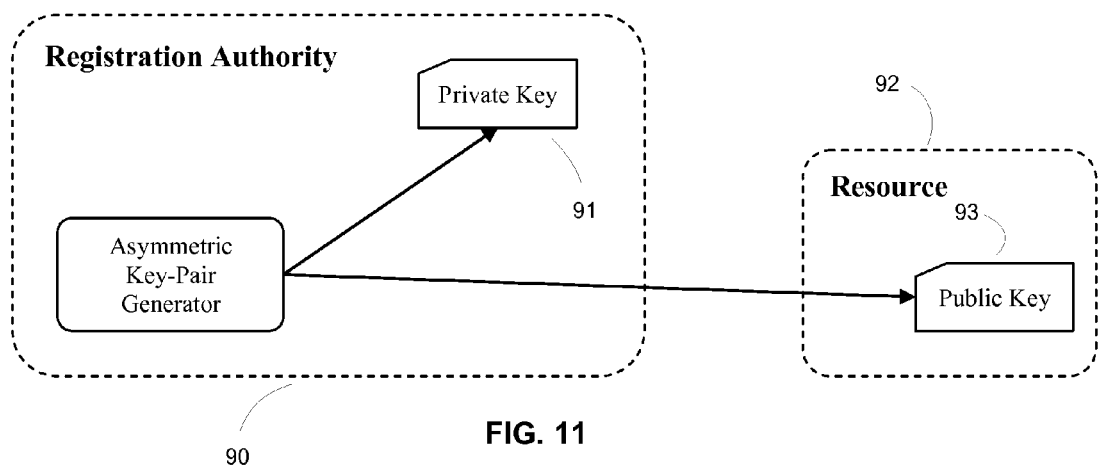
FIG. 11 is a flow diagram of generating an asymmetric key pair.

FIG. 11 illustrates the initialization of this authentication method. An authority 90 generates an asymmetric cipher key-pair: private-key 91 and public-key 93. The authority keeps the private key 91 secret, but provides the public key 93 to the resource 92.

Figure 12:
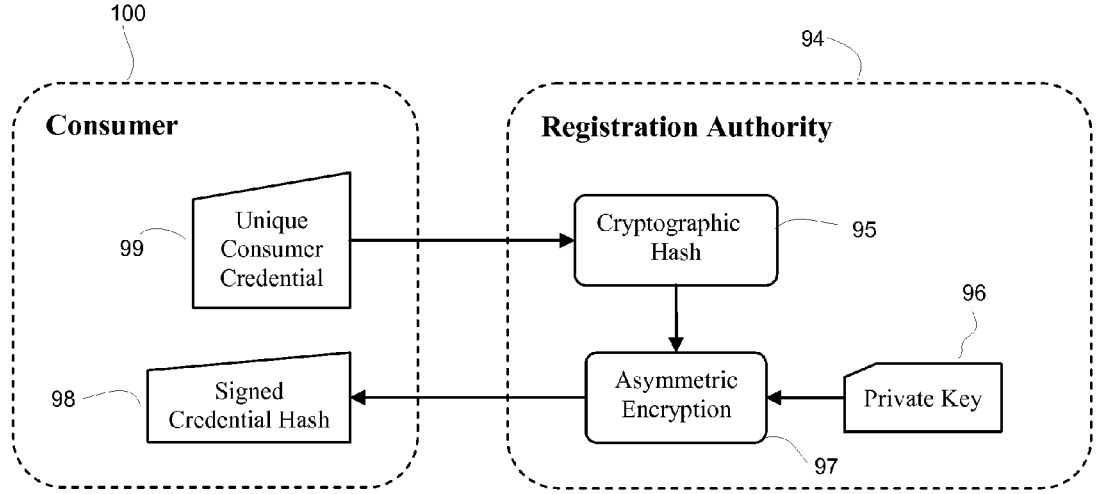
FIG. 12 is a flow diagram of a registration authority granting access to a resource.

The registration of a consumer is shown in FIG. 12. The authority 94 grants a consumer 100 access to a resource, i.e. registers a consumer, by performing asymmetric encryption 97 on the cryptographic hash 95 of the consumer's credential 99 using the authority's secret private key 96. This signed (encrypted) credential hash 98 is kept by the consumer 100.

Figure 13:
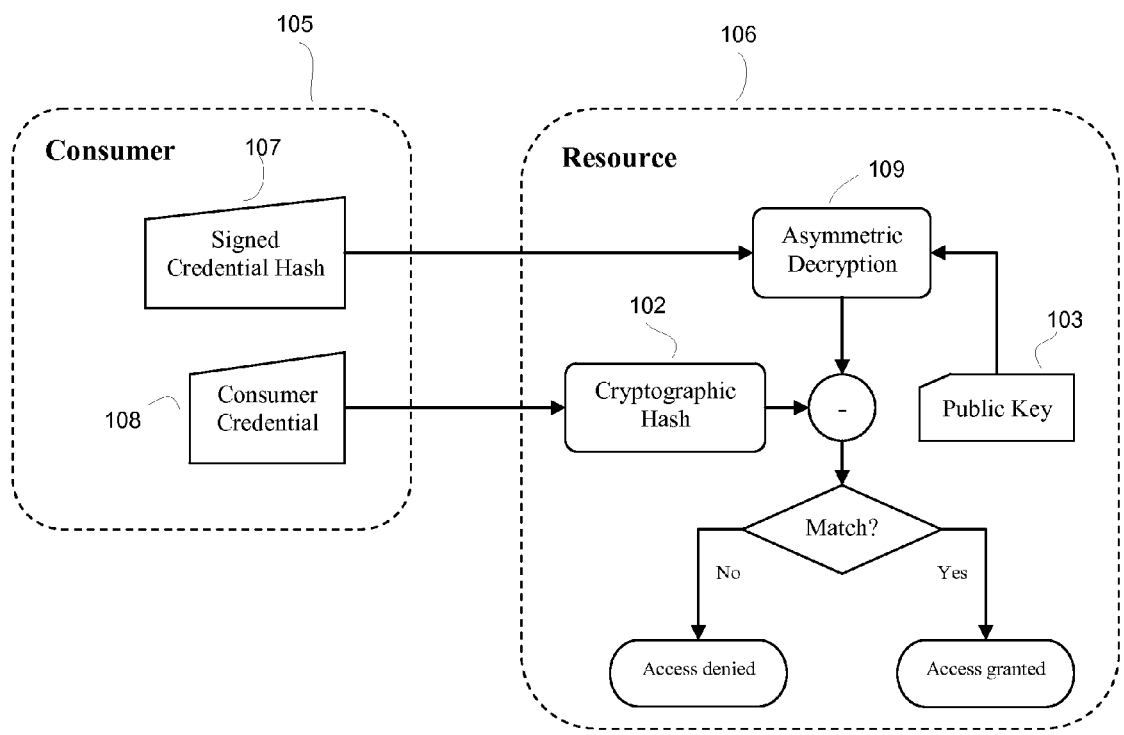
FIG. 13 is a flow diagram of authentication of credentials.

Authentication is illustrated in FIG. 13. The consumer 105 submits the signed credential hash 107 and the consumer's raw credential 108 to the resource 106 for authentication. The resource 106 performs a cryptographic hash 102 on the raw credential 108, using the same cryptographic hash as that employed by the registration authority during registration of the consumer. The resource 106 also performs asymmetric decryption 109 on the signed credential hash 107 using the authority's public key 103, and compares the result with the hash of the consumer's raw credential. If they are the same, then the resource grants access to the consumer. This uses the property of asymmetric ciphers that plaintext encrypted using the private key can only be decoded using the corresponding public key.

The key advantage of this authentication method is the relative simplicity, and low storage overhead, in which authorized consumers are registered for access to a resource.

If there are multiple authorized consumers for a given resource, the resource still only requires the storage of a single public key. Similarly, in some embodiments only one private key is stored on the registration authority. In some embodiments each consumer requires its own signed credential hash.

Traditional portable storage authentication schemes require the storage of large tables on the resource, containing the identification and credentials of each authorized consumer. For a large number of authorized consumers, this requires a large memory overhead on the resource, as well as time consuming protocols for registering multiple authorized consumers on the device.

An example additional usage mode would see the establishment of separate authorized groups, for example, a large company may have different departments, say accounting, engineering, and IT.

In this situation, the single registration authority generates separate asymmetric key-pairs for each group. Thereby a resource may be used in only one group by initializing the authentication of the resource with the key-pair of the associated group.

In some embodiments a single resource may be shared by multiple groups. In this situation, the resource may be expanded to support multiple public keys. The same initialization and authentication methods described herein can be used, except that a public key is stored on the resource for each authorized group, and the public key used for authentication is dependent on the group to which each consumer belongs.

Registration of a particular authorized group can be revoked by simply deleting the corresponding public key from the resource.

Host Computer System

Figure 14:
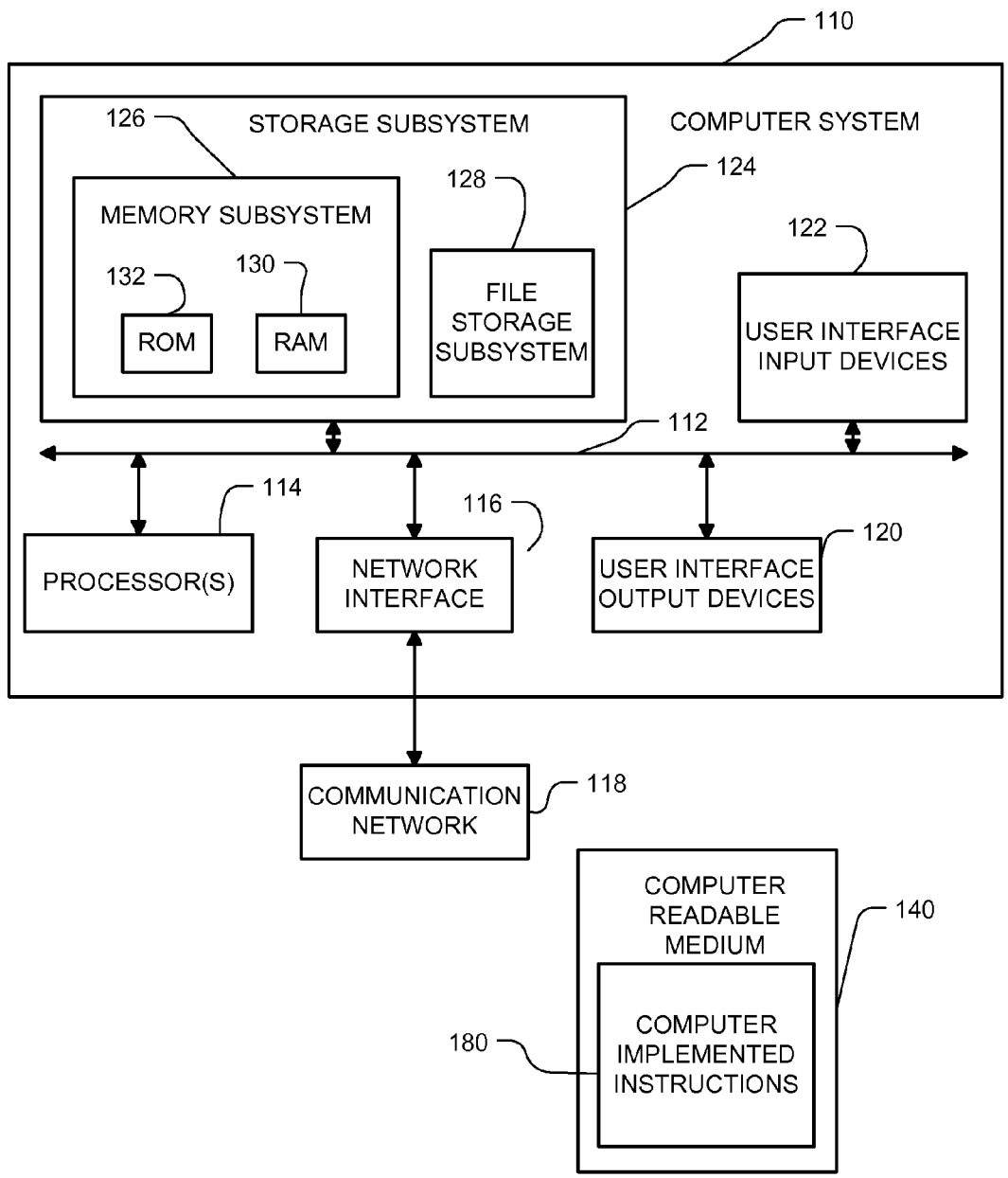
FIG. 14 is a block diagram of an example host.

FIG. 14 is a block diagram of an example host.

Computer system 110 typically includes a processor subsystem 114 which communicates with a number of peripheral devices via bus subsystem 112. These peripheral devices may include a storage subsystem 124, comprising a memory subsystem 126 and a file storage subsystem 128, user interface input devices 122, user interface output devices 120, and a network interface subsystem 116. The input and output devices allow user interaction with computer system 110. Network interface subsystem 116 provides an interface to outside networks, including an interface to communication network 118, and is coupled via communication network 118 to corresponding interface devices in other computer systems. Communication network 118 may comprise many interconnected computer systems and communication links. These communication links may be wireline links, optical links, wireless links, or any other mechanisms for communication of information. While in one embodiment, communication network 118 is the Internet, in other embodiments, communication network 118 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 122 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 10 or onto computer network 118.

User interface output devices 120 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The user interface output devices may also provide non visual display such as via audio output devices. In general, use of the term "output device" is intended to include all possible types of devices and ways to output information from computer system 10 to the user or to another machine or computer system.

Storage subsystem 124 stores the basic programming and data constructs that provide the functionality of certain aspects. For example, the various modules implementing the functionality of authentication and encryption/decryption steps in the prior figures may be stored in storage subsystem 124. These software modules are generally executed by processor subsystem 114. The data constructs stored in the storage subsystem 124 also can include any technology files and other databases mentioned herein. Note that in some embodiments, one or more of these can be stored elsewhere but accessibly to the computer system 110, for example via the communication network 118.

Memory subsystem 126 typically includes a number of memories including a main random access memory (RAM) 130 for storage of instructions and data during program execution and a read only memory (ROM) 132 in which fixed instructions are stored. File storage subsystem 128 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs (or may have been communicated to the computer system 110 via the communication network 118), and may be stored by file storage subsystem 128. The host memory 126 contains, among other things, computer instructions which, when executed by the processor subsystem 114, cause the computer system to operate or perform functions as described herein. As used herein, processes and software that are said to run in or on "the host" or "the computer", execute on the processor subsystem 114 in response to computer instructions and data in the host memory subsystem 126 including any other local or remote storage for such instructions and data.

Bus subsystem 112 provides a mechanism for letting the various components and subsystems of computer system 110 communicate with each other as intended. Although bus subsystem 112 is shown schematically as a single bus, alternative embodiments of the bus subsystem may use multiple busses.

Computer system 110 itself can be of varying types including a personal computer, a portable computer, a workstation, a computer terminal, a network computer, a television, a mainframe, or any other data processing system or user device. Due to the ever changing nature of computers and networks, the description of computer system 110 depicted is intended only as a specific example for purposes of illustrating the preferred embodiments of the present invention. Many other configurations of computer system 110 are possible having more or fewer components than the computer system depicted.

A nontransitory computer readable medium 140 stores computer executable instructions 180 that implement software incorporating aspects of the technology discussed herein.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. An apparatus, comprising:
a portable digital data storage device with a storage peripheral interface connecting to a computer, including:
   a cipher key generation subsystem generating at least two independent cipher key components;
   a cipher using at least the two independent cipher key components to perform data encryption and data decryption;
   an authentication subsystem;
   a non-volatile data storage available to the computer connected to the interface, the non-volatile data storage including:
      a first part storing encrypted user data; and
      a second part storing meta-data used by a controller for authentication and cipher key generation; and
   the controller configuring: (i) the cipher to perform decryption of the encrypted user data of the first part of the non-volatile data storage into user data, and forward the user data to the computer, (ii) the cipher to perform encryption of the user data from the computer and forward the encrypted data to the non-volatile data storage, (iii) the authentication subsystem to authenticate at least two independent credentials including at least a computer signature of the computer connected to the interface and a user credential of a user of the computer connected to the portable storage device, and (iv) the cipher key generation subsystem to retrieve at least the two independent cipher key components using at least the two independent credentials.

2. The apparatus of claim 1, wherein the independent cipher key components are randomly generated in an initialization phase.

3. The apparatus of claim 2, wherein the meta-data in the non-volatile storage are generated in the initialization phase using the independent cipher key components and the independent credentials.

4. The apparatus of claim 3, wherein the meta-data in the non-volatile storage are modifiable using the independent cipher key components and the independent credentials from the computer.

5. The apparatus of claim 4, wherein the cipher combines at least the two independent cipher key components to form a single cipher key for encryption and decryption.

6. The apparatus of claim 5, wherein the authentication subsystem combines at least the two independent credentials to form a combined credential and then performs authentication using the combined credential and the meta-data in the non-volatile storage.

7. The apparatus of claim 6, wherein the authentication compares (i) a first authentication value derived from the combined credentials with (ii) a second authentication value stored in the meta-data in the non-volatile storage.

8. The apparatus of claim 7, wherein the meta-data in the non-volatile storage is stored in a multi-dimensional array, and the multi-dimensional array has different dimensions corresponding to different credential types.

9. The apparatus of claim 7, wherein the meta-data in the non-volatile storage is stored in multiple one-dimensional arrays, different ones of the multiple one-dimensional arrays corresponding to different credential types.

10. The apparatus of claim 6, wherein the authentication relies on a comparison between validation blocks including: (i) a validation block decrypted with the cipher key relied on for encryption and decryption, and (ii) a plaintext validation block stored in the meta-data in the non-volatile storage.

11. The apparatus of claim 3, wherein the independent credentials in the non-volatile storage are modifiable using the independent cipher key components and the independent credentials from the computer.

12. The apparatus of claim 1, wherein the storage peripheral interface is any of USB, Firewire, eSATA, and an Apple dock connector.

13. The apparatus of claim 1, wherein the user credential is from one of a plurality of users registered to the portable storage device.

14. The apparatus of claim 1, wherein the computer signature is from one of a plurality of computers registered to the portable storage device.

15. The apparatus of claim 1, wherein the controller has a plurality of operation modes including:
   a first operation mode for all computers registered with the portable storage device and all users registered with the portable storage device; and
   a second operation mode in which, for a subset of all users registered with the portable storage device, the authentication, decryption and encryption require only one of (i) the computer signature of the computer connected to the interface and (ii) the user credential of a user of the computer connected to the portable storage device.

16. The apparatus of claim 1, wherein the authentication relies on an asymmetric key pair including a private key and a public key, and a comparison between validation blocks received at the portable storage device from the computer connected to the interface, the validation blocks including: (i) a first validation block received in encrypted form at the portable storage device and decrypted at the portable storage device with the public key stored in the meta-data in the non-volatile storage, and (ii) a plaintext validation block.

* * * * *